April 6, 1948. M. M. BALSAM ET AL 2,439,280
MACHINE FOR MAKING BELTS AND STRAPS
Filed Oct. 19, 1946 6 Sheets-Sheet 5

Fig.5.

INVENTORS
Maurice M. Balsam and Henry M. Balsam
BY

Fig. 6.

UNITED STATES PATENT OFFICE 2,439,280

MACHINE FOR MAKING BELTS AND STRAPS

Maurice M. Balsam and Henry M. Balsam, New York, N. Y., assignors to M. M. Balsam, Inc., New York, N. Y.

Application October 19, 1946, Serial No. 704,332

17 Claims. (Cl. 164—16)

Our present invention relates to machines for making belts and straps from a strip of flexible material.

It is an object of our present invention to provide a machine with which it is possible to automatically cut belts and straps from strip material.

It is also an object of our present invention to provide an automatic machine of the above type which makes it possible to automatically cut not only the belts and straps to their proper length, but also to cut into the same the necessary holes for the buckle.

It is finally, also an object of our present invention to equip an automatic belt or strap making machine with means for adjusting the length of the belts and straps produced by this machine.

With the above objects in view, our present invention mainly relates to a machine for making belts of a strip of flexible material and consists in combination of a series of cooperating elements, namely: rotatable cutting means adapted to cut a strip of flexible material into belts, rotatable transporting means adapted to transport this strip of flexible material to the above mentioned rotatable cutting means, continuously rotating driving means for driving the above rotatable cutting means and rotatable transporting means, first connecting means adapted to connect periodically the above mentioned continuously rotating driving means with the rotatable transporting means so as to cause alternative periods of transportation and periods of stand-still of these transporting means, and second connecting means adapted to connect periodically the above mentioned continuously rotating driving means with the rotatable cutting means so as to cause alternative periods of cutting and periods of stand-still of these rotatable cutting means.

In accordance with a preferred embodiment of our present invention, the rotatable transporting means consists of rotatable transporting rollers and the rotatable cutting means consists of rotatable cutting rollers.

Furthermore, the above defined first connecting means consist of first connecting gear means driven by the continuously rotating driving means and adapted to drive the rotatable transporting rollers, and of first operating means adapted to connect periodically these first connecting gear means with the rotatable transporting rollers so as to cause alternative periods of transportation and periods of stand-still of these rotatable transporting rollers.

Similarly, the second connecting means mentioned above consist of second connecting gear means driven by the continuously rotating driving means and adapted to drive the rotatable cutting rollers and of second operating means adapted to connect periodically these second connecting gear means with the rotatable cutting rollers so as to cause alternative periods of cutting and periods of stand-still of these cutting rollers.

We have found it advisable to use as first connecting gear means a first gear train and as first operating means a clutch mechanism adapted to operate as set forth above.

We have also found it advisable to use as second connecting gear means a second gear train and as second operating means a Geneva Cross type mechanism adapted to rotate the cutting rollers as set forth above.

In order to enable adjustment of the length of the belts produced by our new machine, we provide manually adjustable regulating means combined with the first operating means defined above, e. g., combined with the clutch mechanism and construct these regulating means so that they are adaptd to vary the length of the periodical connections between the first gear train and the rotatable transporting rollers, thereby causing variation of the length of the consecutive transportation periods of these rollers and causing also variation of the length of the flexible strip material transported during each of these consecutive transportation periods.

It should be stressed that it is of great importance that the second operating means defined above, e. g., the Geneva Cross type mechanism is adapted to connect the rotatable cutting rollers with the driving gear train once during each of the transportation periods of the rotatable transporting rollers so as to cause one period of cutting of the rotatable cutting rollers during each of the transportation periods of the rotatable transporting rollers.

In order to prevent unintentional turning of the transporting rollers during their periods of stand-still, we found it advisable to combine with these transporting rollers brake means so as to prevent unintentional turning of the same during their periods of stand-still.

Similarly, we provide stop means combined with a Geneva Cross type mechanism so as to prevent unintentional turning of the rotatable cutting rollers during their periods of stand-still.

Our new machine might be used for producing belts and straps of various types. We found that it is particularly adapted for production of belts of conventional type, i. e., of belts having near one end of the same one longitudinal hole through which the buckle pin is passing when it is secured to the belt, and a series of holes near its other end for closing the belt in usual manner.

In order to produce these holes simultaneously with cutting the belts to their proper length, we found it advisable to provide rotatable cutting rollers having cooperating peripheral faces, at least one of which is provided with various cutting members, e. g., cutting projections so as to obtain the desired results. These cutting projections provided by us on the cutting rollers are two differently shaped longitudinal cutting projections arranged transversely to the direction of rotation of the cutting rollers and adapted to cut the flexible strip material passing through these cutting rollers into a series of belts having differently shaped ends, a plurality of small hole cutting projections arranged on one side of these differently shaped longitudinal cutting projections in direction of rotation of the cutting rollers so as to be adapted to cut the necessary belt holes into each of the belts cut by the above mentioned differently shaped longitudinal cutting rollers, and one longitudinal cutting projection arranged on the other side of the differently shaped longitudinal cutting projections and extending in direction of rotation of the rotatable cutting rollers so as to be adapted to cut into each of the belts produced by the cutting rollers the longitudinal hole necessary for securing the buckle to the belt.

The novel features which we consider as characteristic for our invention are set forth in particular in the appended claims. The invention itself however, both as to its construction and its method of operation, together with additional objects and advantages thereof, will be best understood from the following description of specific embodiments when read in connection with the accompanying drawings, in which:

As shown in the drawings, our new machine comprises as main elements the two transporting rollers 10 and 11 which cooperate with the transporting table 12 provided with a feeding channel not shown in the drawings, and the cutting rollers 13 and 14 to which the strip material 15 guided by the roller 16 is fed by the transporting rollers 10 and 11.

In order to drive these transporting and cutting rollers, we provide an electric motor 17 connected by shaft 18 with the continuously rotating driving gears 19 and 20.

Gear 19 is permanently in mesh with gear 21 turnably carried by the pin 22 firmly secured to the arm 23. This arm 23 is turnable to and fro in direction of arrow 24 about the axis of shaft 18 so that the gears 19 and 21 are permanently in mesh despite turning of the latter gear during movement of the arm 23 supporting it.

Figure 1:
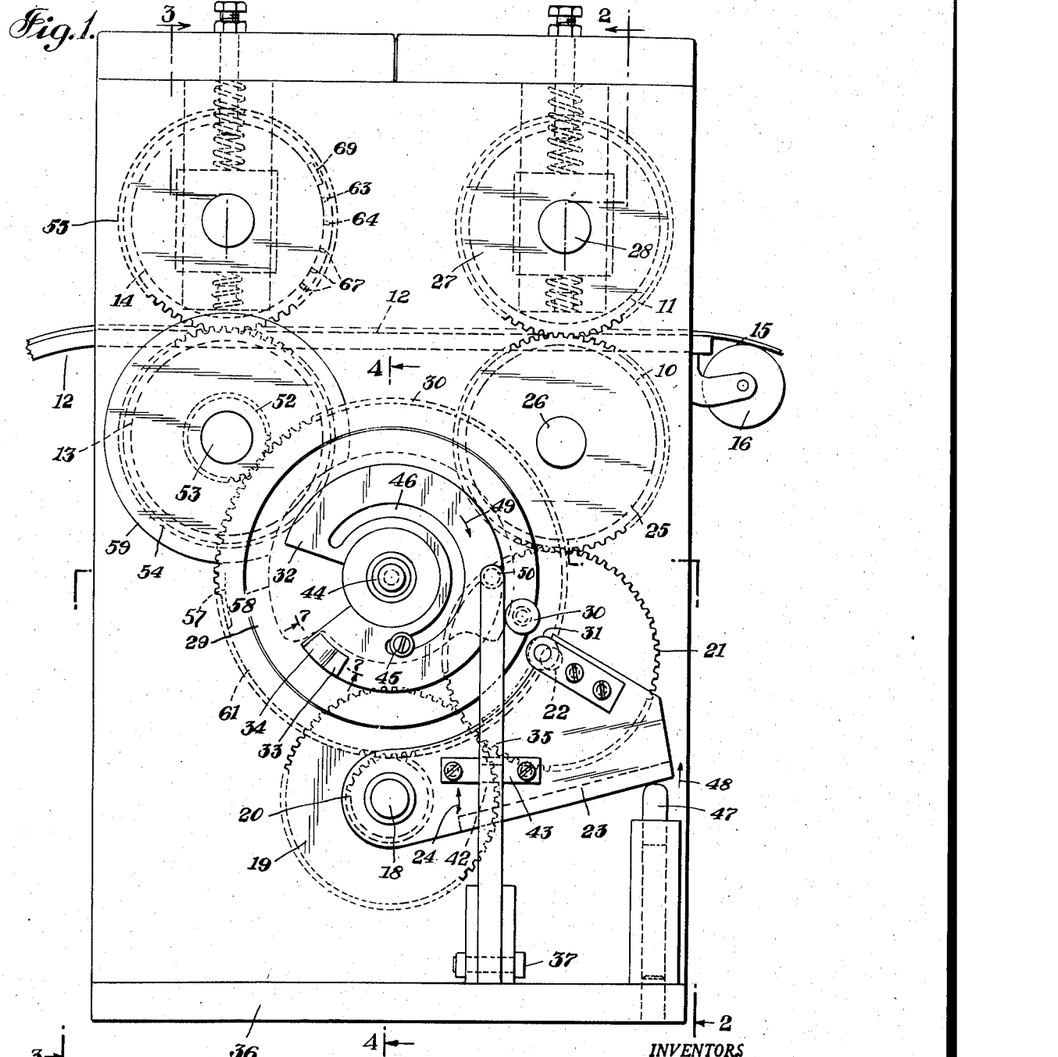
Fig. 1 is an elevational view of an automatic belt producing machine according to our present invention.

The gear 21 is in mesh with the gear 25 rotatably carried by shaft 26, when gear 21 is in its operative position shown in Fig. 1. When gear 21 is turned together with arm 23 into its inoperative position shown in Fig. 5, the gears 21 and 25 are out of mesh.

The gear 25 is permanently in mesh with the gear 27 secured to the shaft 28 carrying the transporting roller 10. Thus, when gear 21 is in its position shown in Fig. 1, and motor 17 operates, the transporting rollers 10 and 11 are turned by means of shaft 18 and the gear train consisting of the gears 19, 21, 25 and 27.

Figure 5:
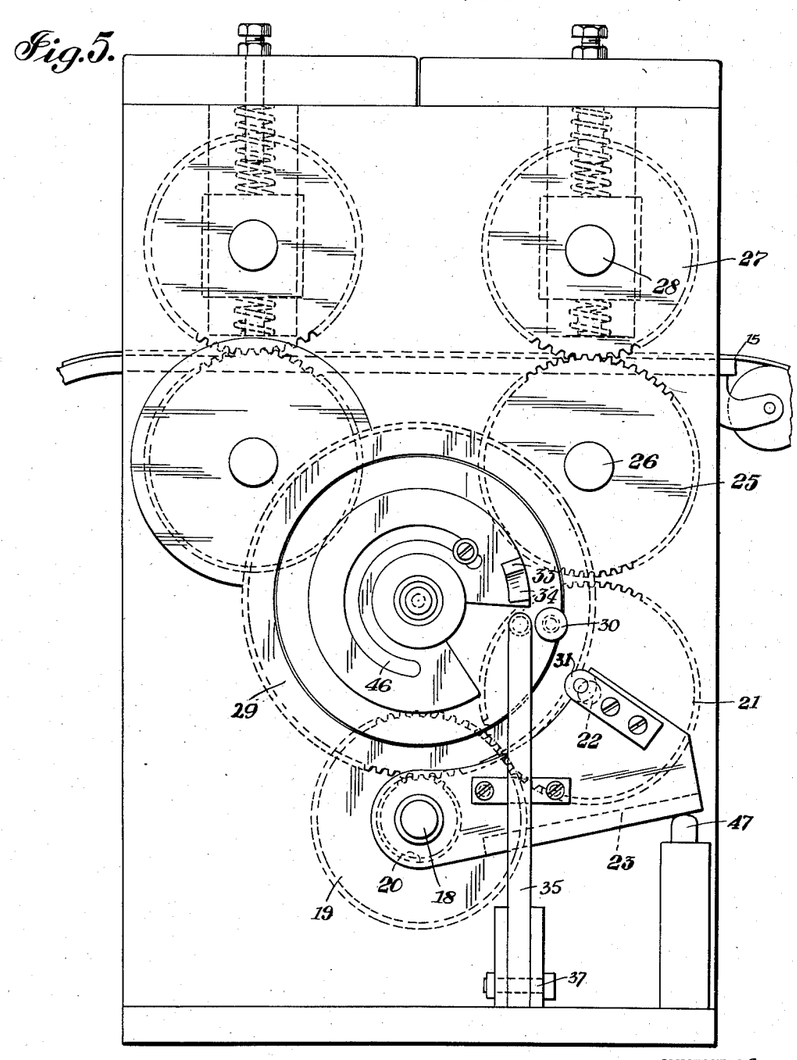
Fig. 5 is a partial front view of the machine shown in Figs. 1 to 4 similar to the front view shown in Fig. 1, with the transporting rollers disconnected from the driving means.
Figure 6:
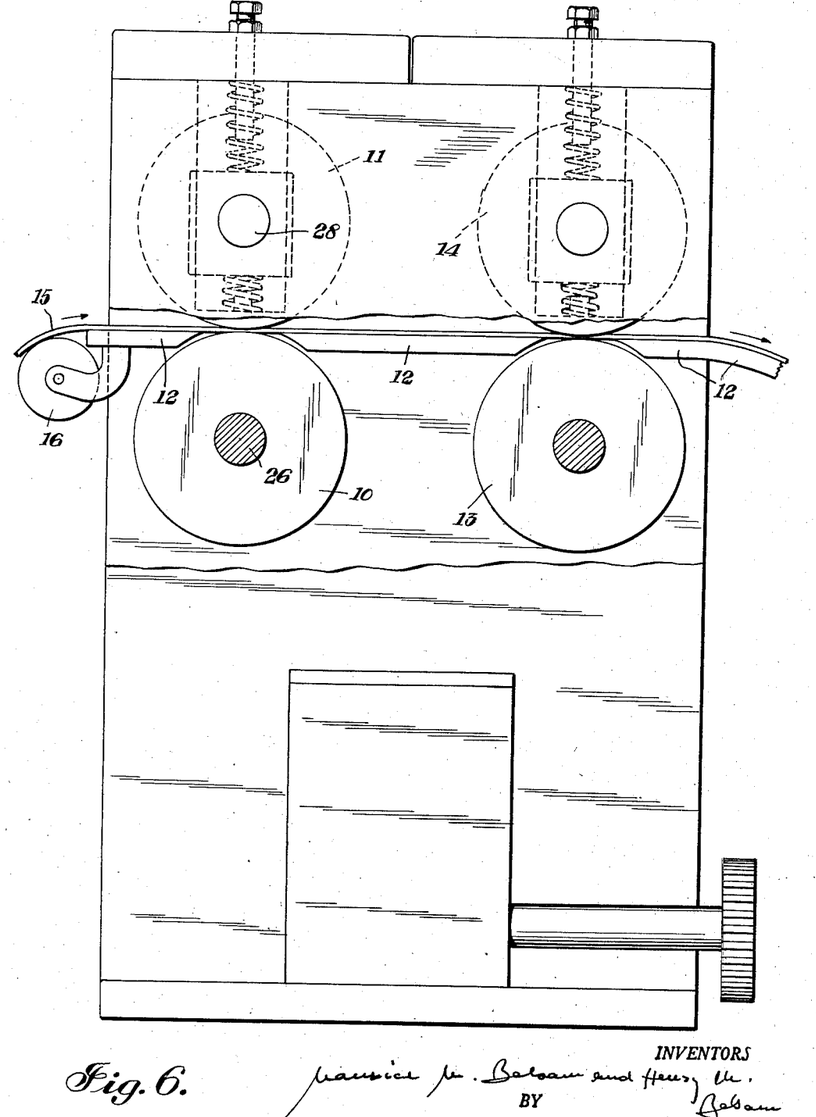
Fig. 6 is a rear view of the machine shown in Figs. 1 to 5, seen in direction of arrow 6 of Fig. 2.

In order to obtain alternating periods of turning and stand-still of the transporting rollers, we provide operating means to turn periodically the gear 21 from its operative position shown in Fig. 1 into its inoperative position shown in Fig. 5 and back, whenever required.

These operating means include the gear 29 which is in mesh with and driven by the gear 20 mentioned above. These operating means included also the pin 30 mounted on gear 29 so as to be adapted to engage the projecting member 31 mounted on arm 23.

Figure 7:
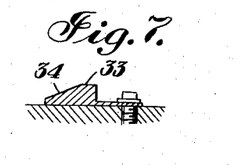
Fig. 7 is a cross section through a part of the regulating means shown in Fig. 1, along line 7—7 of Fig. 1.

Furthermore, we provide on gear 29 a disc shaped member 32 arranged coaxially with gear 29 turnably relative to the latter. This disc 32 carries a projecting pin 33 provided with a slanting face 34 as clearly shown in Fig. 7.

Figure 2:
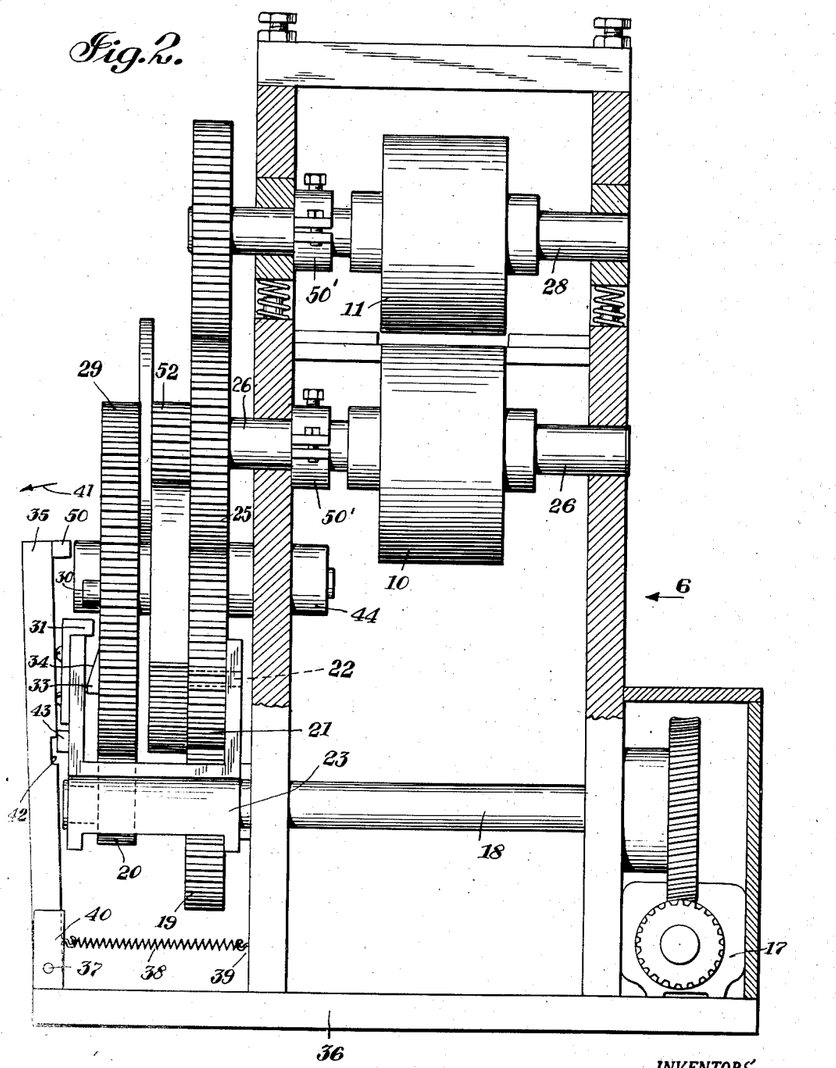
Fig. 2 is a side view of the machine shown in Fig. 1 seen in direction of arrow 2 of Fig. 1, partly in section along line 2—2 of Fig. 1.

The projecting pin 33 is arranged so as to be adapted to engage with its slanting face 34 the lever member 35 pivoted to the supporting frame 36 of the machine by means of pivot 37 as clearly shown in Figs. 1 and 2. The spring 38, clearly shown in Fig. 2, is provided at its one end 39 to the supporting frame 36 and at its other end 40 to the lever member 35 tending to turn the same in direction of arrow 41.

The lever member 35 is provided with a cutout 42 adapted to engage the projection 43 provided on arm 23 when the same is in the position shown in Fig. 5, that is, when the gear 21 and the arm 23 are in inoperative disengaged position.

The disc 32 together with the projecting pin 33 might be adjusted relative to gear 29 by turning them about the shaft 44 carrying both the disc 32 and the gear 29.

In order to secure the disc 32 in different positions to the gear 29, we provide on gear 29 an adjusting screw 45 and cut an arcuate groove 46 into disc 32 cooperating with screw 45 as shown in Fig. 1.

The above described operating means operate as follows:

In the position shown in Fig. 1, the spring pressed plunger 47 will press the arm 23 upward in direction of arrow 48 and thus force gear 21 into mesh with gear 25. Thus, in this position the gears 19, 21, 25 and 27 will be in mesh and the transporting rollers 10 and 11 will rotate when motor 17 rotates gear 20.

During such operation of the machine, the gear 29 rotating in direction of arrow 49 will turn the pin 30 into contact with the projecting member 31 mounted on arm 23, and the same will be turned by pin 30 in clockwise direction into the position shown in Fig. 5. In this position the projection 43 provided on arm 23 will engage the cut-out 42 on lever 35 and this lever will thus hold the arm 23 together with the gear 21 in the inoperative position shown in Fig. 5.

This will result in stopping of the transporting rollers 10 and 11. At the same time, the gear 29 will continue to rotate in direction of arrow 49 until the slanting face 34 of the projecting pin 33 engages the top end 50 of the lever 35 and pushes the same outward in the direction of arrow 41.

Such movement of the lever 35 will result in sliding out of the projection 43 from the cut-out 42 and permit spring 47 to move the arm 23 together with gear 21 in direction of arrow 48 back into the operative position shown in Fig. 1.

As soon as the arm 23 and the gear 21 are back in the position shown in Fig. 1, the gear train driving the transporting rollers 10 and 11 is completed, and the same start to rotate again.

Thus, the operating means described above will rotate the transporting rollers from the moment the projecting pin 33 on disc 32 contacts the top end 50 of lever 35 until the moment the pin 30 on gear 29 pushes against the projecting member 31 on arm 23. From the above also follows that from the moment pin 30 on gear 29 pushes against the projecting member 31 on arm 23 until the moment the projecting pin 33 on disc 32 contacts the top end 50 of lever 35 the connection between the driving motor 17 and the transporting rollers 10 and 11 will be interrupted and these transporting rollers will stand still.

In order to adjust the length of the periods of rotation and stand-still of the transporting rollers 10 and 11, it is only necessary to loosen screw 45, to turn disc 32 relative to gear 29 and to tighten screw 45 again. In this way it is possible to adjust the angular distance between the pin 30 and the projecting pin 33 and thus to regulate operation of the operating means described above so as to regulate the length of the periods of rotation and standstill of the transporting rollers as desired.

It is advisable to provide brake means 50 cooperating with the shaft 28 so as to avoid unintentional turning of the transporting rollers while gear 21 is disconnected from gear 26, i. e., while the driving gear train is in the inoperative position shown in Fig. 5, and the transporting rollers 10 and 11 are in stand-still.

The cutting rollers 13 and 14 are rotated by the motor 17 by means of shaft 18, the gear 20 secured to shaft 18, the gear 29 being in mesh with gear 20, the shaft 44, the partial gear 51 firmly secured to shaft 44, the gear 52 adapted to mesh with the teeth of gear 51, the shaft 53 carrying gear 52 and the gears 54 and 55 transmitting the rotating motion to the cutting rollers 13 and 14.

Figures 8, 9:
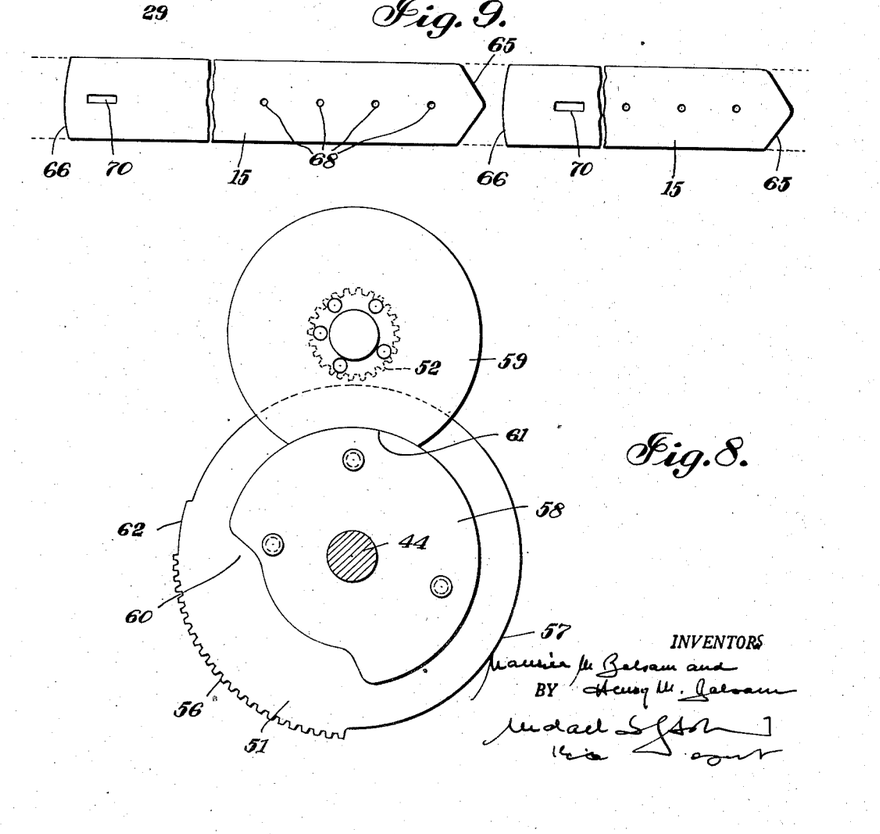
Fig. 8 is a sectional view along line 8—8 of Fig. 3.
Fig. 9 is a top view of belts produced with a machine of the type shown in Figs. 1 to 7.

In order to obtain the required periods of turning and stand-still of the cutting rollers 13 and 14, gear 51 is provided, as clearly shown in Fig. 8, only with a relatively short arc of teeth 56, while the remaining portion of the peripheral face 57 is smooth and has a smaller diameter than the teeth 56 so as not to engage the teeth of gear 52.

Thus gear 52 will be turned by gear 51 only while the teeth 56 of gear 51 are in mesh with the teeth of gear 52. From above it follows that the gear 52 will turn only during one quarter of turning of the gear 51; accordingly, during three-quarter of turning of gear 51, the gear 52 will not be turned and the cutting rollers 13 and 14 rotated by gear 52 will be in stand-still.

In this manner it is possible to transform the continuous movement of shaft 18 and of the gears 20, 29 and 51 into intermittent movement of the gears 52, 54 and 55 and of the cutting rollers 13 and 14 driven by the same. This intermittent movement consists, as evident from above, of alternating periods of turning and of stand-still.

Gear 51 has to be secured to shaft 44 in such a manner that it is in mesh with the gear 52 while gear 21 is in mesh with gear 25. This can be easily attained by properly adjusting the relative position of gears 51 and 29 on shaft 44.

Figure 3:
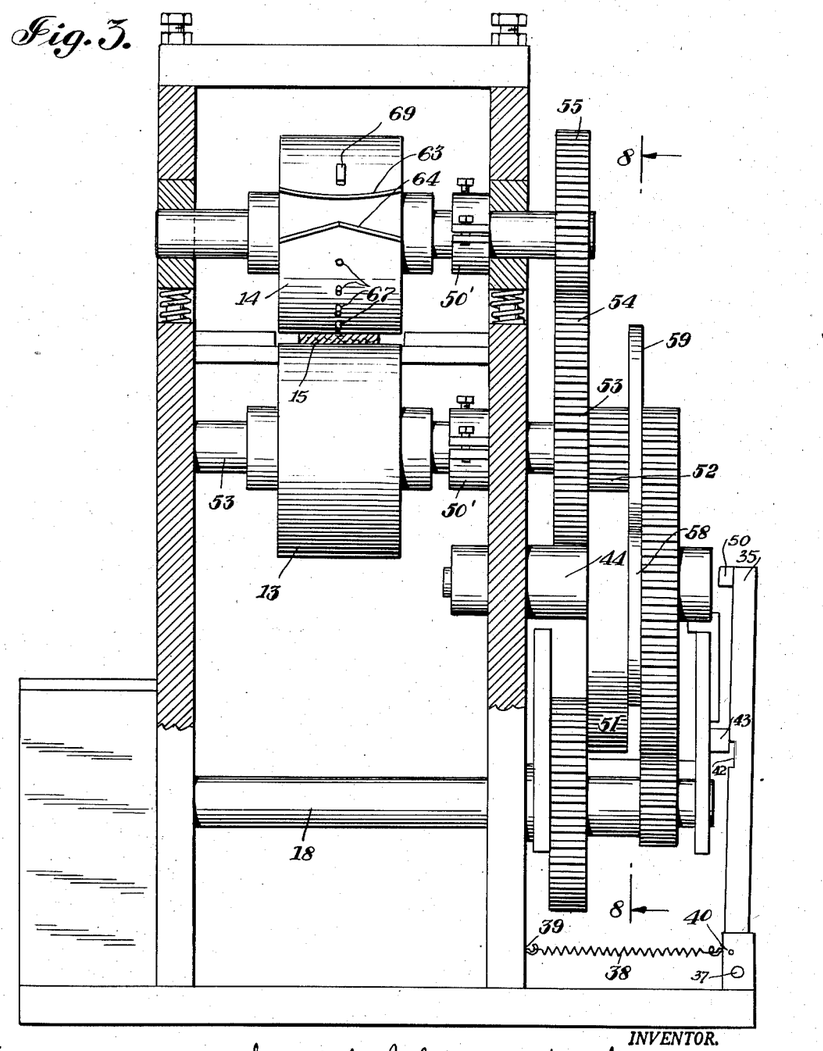
Fig. 3 is another side view of the machine shown in Fig. 1, seen in direction of arrow 3 of Fig. 1, partly in section along line 3—3 of Fig. 1.
Figure 4:
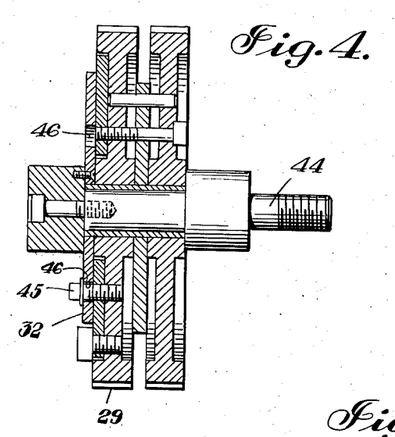
Fig. 4 is an elevational section through the lower part of the machine shown in Figs. 1–3, along line 4—4 of Fig. 1.

In order to prevent unintentional turning of gears 52, 54 and 55 and of the cutting rollers 13 and 14 after disengagement of the gears 51 and 52, we provide blocking means consisting of two cooperating discs 58 and 59. The disc 58 is secured to gear 51 and disc 59 is secured to gear 52 in the manner clearly shown in Figs. 3 and 8.

Disc 58 is provided with a cut-out 60 and disc 59 is provided with a cut-out 61 having the shape shown in Fig. 8. These cut-outs 60 and 61 are shaped so as to enable rotation of gear 52 relative to gear 51 only when the arcuate teeth portion 56 of gear 51 is in mesh with the teeth of gear 52. As soon as the teeth of the arcuate teeth portion 56 move out of mesh with the teeth of gear 52, the disc 59 blocks turning of disc 58 and of the gear 51 secured thereto until the moment the teeth forming the arcuate teeth portion 56 again engage the teeth of gear 52.

As shown in Fig. 8, an arcuate portion 62 of the peripheral face of gear 51 is cut-out only to the pitch diameter of the gear so as to serve as further means for preventing turning of gear 52.

The above described Geneva Cross type movement operates so that the continuous rotating movement of shaft 18 and gears 20, 29 and 51 is transformed into intermittent turning movement of the gears 52, 54 and 55, and of the cutting rollers 13 and 14 consisting of periods of turning and periods of stand-still. The gears 51 and 29 are adjusted so that the periods of turning of the cutting rollers coincide with the periods of turning of the transporting rollers 10 and 11 so that the cutting rollers are turned only while the transporting rollers rotate.

Our above described machine operates as a unit as follows:

At the moment of start of operation of the machine the projecting pin 33 on disc 32 contacts the top end 50 of lever 35 and pushes the same outward, which results in start of rotation of the transporting rollers 10 and 11. After a certain time of turning of these rollers the teeth of the arcuate gear portion 56 of gear 51 will engage the teeth of gear 52 and start turning of the cutting rollers 13 and 14. The cutting rollers 13 and 14 will be turned until the teeth of the arcuate gear portion 56 become disengaged from gear 52 and then gear 52 and the cutting rollers 13 and 14 will turn.

During all this time, i. e., from the moment the projecting pin 33 on disc 32 has contacted and pushed against the lever 35, the transporting rollers 10 and 11 rotate. They are still rotating at the moment the cutting rollers 13 and 14 stop to turn and they rotate until the moment the gear 29 turns into a position in which the pin 30 mouned on this gear pushes against the projecting member 31 on arm 23. This will result in disengagement of the gears 21 and 25 and stopping of the transporting rollers 10 and 11.

The transporting rollers will start to rotate again as soon as the projecting pin 30 contacts again the lever 35 as explained above.

Thus, one complete cycle of operation of the machine consists of the following phases:

First phase: The transporting rollers will rotate alone and the cutting rollers will be in standstill. During this phase of operation the strip material will be fed by the transporting rollers between the cutting rollers which are provided with a receding peripheral portion so as not to engage the strip material during this phase of the operation.

Second phase: The cutting rollers will start to rotate and the transporting rollers will continue to rotate. During this phase of operation the strip material is fed by the transporting rollers between the cutting rollers and cut by the same.

Third phase: The cutting rollers stop to turn and the transporting rollers continue to rotate. During this phase of operation the necessary adjusted length of strip material is fed by the transporting rollers through the cutting rollers without being cut by the same.

Fourth phase: The transporting rollers stop to rotate and the cutting rollers remain in standstill. During this phase of operation the continuously rotating parts of the machine continue to operate so as to enable adjustment of the length of the single strip portions transported during each cycle of operation as set forth above.

After the fourth phase of operation the transporting rollers will start to operate again and a next cycle of operation will start.

With a machine of the type described above it is possible to produce automatically belts of the type shown in Fig. 9. For this purpose one of the cutting rollers, for instance, cutting roller 14 is provided with two cutting projections 63 and 64 which cut the ends 65 and 66 of the belts shown in Fig. 9. Furthermore, roller 14 is provided with a plurality of cutting projections 67 by which the belt holes 68 are punched. Finally, the roller 14 is also provided with a longitudinal cutting projection 69 by which hole 70 for the pin of the belt buckle is punched into the strip material used for the belts.

It will be understood that each of the elements described above, or two or more together, may also find a useful application in other types of machines for manufacturing belts and straps differing from the types described above.

While I have illustrated and described the invention as embodied in automatic belt manufacturing machines, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the stand-point of prior art, fairly constitute essential characteristics of the generic or specific aspects of this invention and therefore, such adaptation should and are intended to be comprehended within the meaning and range of equivalence of the following claims.

What we claim as new and desire to secure by Letters Patent is:

1. A machine for making belts from a strip of flexible material comprising in combination rotatable cutting means adapted to cut said strip of flexible material; rotatable transporting means adapted to transport said strip of flexible material to said rotatable cutting means; continuously rotating driving means for driving said rotatable cutting means and said rotatable transporting means; first motion transmitting means driven by said continuously rotating driving means and driving said rotatable transporting means during consecutive transportation periods interrupted by periods of stand-still of said rotatable transporting means; and second motion transmitting means driven by said continuously rotating driving means and intermittently driving said rotatable cutting means during consecutive cutting periods interrupted by periods of stand-still of said rotatable cutting means.

2. A machine for making belts from a strip of flexible material comprising in combination rotatable cutting means adapted to cut said strip of flexible material; rotatable transporting means adapted to transport said strip of flexible material to said rotatable cutting means; continuously rotating driving means for driving said rotatable cutting means and said rotatable transporting means; first motion transmitting means driven by said continuously rotating driving means and driving said rotatable transporting means during consecutive transportation periods interrupted by periods of stand-still of said rotatable transporting means; regulating means combined with said first motion transmitting means for adjusting the length of said consecutive transportation periods thereby varying the length of strip material transported during each of said transportation periods; and second motion transmitting means driven by said continuously rotating driving means and intermittently driving said rotatable cutting means during consecutive periods interrupted by periods of stand-still of said rotatable cutting means.

3. A machine for making belts from flexible strip material comprising in combination rotatable cutting means adapted to cut said flexible strip material; rotatable transporting means adapted to transport said flexible strip material to said rotatable cutting means; continuously rotating driving means driving said rotatable cutting means and said rotatable transporting means; first disconnecting means adapted to interrupt periodically the connection between said continuously rotating driving means and said rotatable transporting means so as to cause alternative periods of transportation and periods of stand-still of said rotatable transporting means; and second disconnecting means adapted to interrupt periodically the connection between said continuously rotating driving means and said rotatable cutting means so as to cause alternative periods of cutting and periods of stand-still of said rotatable cutting means.

4. A machine for making belts from flexible strip material comprising in combination rotatable cutting means adapted to cut said flexible strip material; rotatable transporting means adapted to transport said flexible strip material to said rotatable cutting means; continuously rotating driving means driving said rotatable cutting means and said rotatable transporting means; first disconnecting means adapted to interrupt periodically the connection between said continuously rotating driving means and said rotatable transporting means so as to cause alternative periods of transportation and periods of stand-still of said rotatable transporting means; regulating means combined with said first disconnecting means and adapted to adjust operation of the same so as to vary the length of said periodical interruptions of the connection between said continuously rotating driving means and said rotatable transporting means thereby causing adjustment of the length of said consecutive transportation periods and varying the length of flexible strip material transported during each of said transportation periods; and second disconnecting means adapted to interrupt periodically the connection between said continuously rotating driving means and said rotatable cutting means so as to cause alternative periods of cutting and periods of stand-still of said rotatable cutting means.

5. A machine for making belts from flexible strip material comprising in combination rotatable cutting means adapted to cut said flexible strip material; rotatable transporting means adapted to transport said flexible strip material to said rotatable cutting means; continuously rotating driving means driving said rotatable cutting means and said rotatable transporting means; first connecting means adapted to connect periodically said continuously rotating driving means with said rotatable transporting means so as to cause alternative periods of transportation and periods of stand-still of said rotatable transporting means; and second connecting means adapted to connect periodically said continuously rotating driving means with said rotatable cutting means so as to cause alternative periods of cutting and periods of stand-still of said rotatable cutting means.

6. A machine for making belts from flexible strip material comprising in combination rotatable cutting means adapted to cut said flexible strip material; rotatable transporting means adapted to transport said flexible strip material to said rotatable cutting means; continuously rotating driving means driving said rotatable cutting means and said rotatable transporting means; first connecting means adapted to connect periodically said continuously rotating driving means with said rotatable transporting means so as to cause alternative periods of transportation and periods of stand-still of said rotatable transporting means; regulating means combined with said first connecting means and adapted to vary the length of said periodical connections between said continuously rotating driving means and said rotatable transporting means thereby causing variation of the length of said consecutive transportation periods and of the length of the flexible strip material transported during each of said consecutive transportation periods; and second connecting means adapted to connect periodically said continuously rotating driving means with said rotatable cutting means so as to cause alternative periods of cutting and periods of stand-still of said rotatable cutting means.

7. A machine for making belts from flexible strip material comprising in combination rotatable cutting rollers adapted to cut said flexible strip material; rotatable transporting rollers adapted to transport said flexible strip material between said rotatable cutting rollers; continuously rotating driving means; first connecting gear means driven by said continuously rotating driving means and adapted to drive said rotatable transporting rollers; first operating means adapted to connect periodically said first connecting gear means with said rotatable transporting rollers so as to cause alternative periods of transportation and periods of stand-still of said rotatable transporting rollers; second connecting gear means driven by said continuously rotating driving means and adapted to drive said rotatable cutting rollers; and second operating means adapted to connect periodically said second connecting gear means with said rotatable cutting rollers so as to cause alternative periods of transportation and periods of stand-still of said rotatable cutting rollers.

8. A machine for making belts from flexible strip material comprising in combination rotatable cutting rollers adapted to cut said flexible strip material; rotatable transporting rollers adapted to transport said flexible strip material between said rotatable cutting rollers; continuously rotating driving means; first connecting gear means driven by said continuously rotating driving means and adapted to drive said rotatable transporting rollers; first operating means adapted to connect periodically said first connecting gear means with said rotatable transporting rollers so as to cause alternative periods of transportation and periods of stand-still of said rotatable transporting rollers; manually adjustable regulating means combined with said first operating means and adapted to vary the length of said periodical connections between said first connecting gear means and said rotatable transporting rollers thereby causing variation of the length of said consecutive transportation periods and of the length of flexible strip material transported during each of said consecutive transportation periods; second connecting gear means driven by said continuously rotating driving means and adapted to drive said rotatable cutting rollers; and second operating means adapted to connect periodically said second connecting gear means with said rotatable cutting rollers so as to cause alternative periods of transportation and periods of stand-still of said rotatable cutting rollers.

9. A machine for making belts from flexible strip material comprising in combination rotatable cutting means adapted to cut said flexible strip material; rotatable transporting means adapted to transport said flexible strip material to said rotatable cutting means; continuously rotating driving means driving said rotatable cutting means and said rotatable transporting means; first connecting means adapted to connect periodically said continuously rotating driving means with said rotatable transporting means so as to cause alternative periods of transportation and periods of stand-still of said rotatable transporting means; and second connecting means adapted to connect periodically once during each of said transportation periods of said rotatable transporting means said continuously rotating driving means with said rotatable cutting means so as to cause one period of cutting during each of said transportation periods interrupted by periods of stand-still of said rotatable cutting means.

10. A machine for making belts from flexible strip material comprising in combination rotatable cutting means adapted to cut said flexible strip material; rotatable transporting means adapted to transport said flexible strip material to said rotatable cutting means; continuously rotating driving means driving said rotatable cutting means and said rotatable transporting means; first connecting means adapted to connect periodically said continuously rotating driving means with said rotatable transporting means so as to cause alternative periods of transportation and periods of stand-still of said rotatable transporting means; regulating means combined with said first connecting means and adapted to vary the length of said periodical connections between said continuously rotating driving means and said rotatable transporting means thereby causing variation of the length of said consecutive transportation periods and of the length of the flexible strip material transported during each of said consecutive transportation periods; and second connecting means adapted to connect periodically once during each of said transportation periods of said rotatable transporting means said continuously rotating driving means with said rotatable cutting means so as to cause one period of cutting during each of said transportation periods interrupted by periods of stand-still of said rotatable cutting means.

11. A machine for making belts from flexible strip material comprising in combination rotatable cutting rollers adapted to cut said flexible strip material; rotatable transporting rollers adapted to transport said flexible strip material between said rotatable cutting rollers; continuously rotating driving means; first connecting gear means driven by said continuously rotating driving means and adapted to drive said rotatable transporting rollers; first operating means adapted to connect periodically said first connecting gear means with said rotatable transporting rollers so as to cause alternative periods of transportation and periods of stand-still of said rotatable transporting rollers; second connecting gear means driven by said continuously rotating driving means and adapted to drive said rotatable cutting rollers; and second operating means adapted to connect periodically once during each of said transportation periods of said rotatable transporting rollers said continuously rotating driving means with said rotatable cutting rollers so as to cause one period of cutting of said rotatable cutting rollers during each of said transportation periods of said rotatable transporting rollers interrupted by periods of stand-still of said rotatable cutting rollers.

12. A machine for making belts from flexible strip material comprising in combination rotatable cutting rollers adapted to cut said flexible strip material; rotatable transporting rollers adapted to transport said flexible strip material between said rotatable cutting rollers; continuously rotating driving means; first connecting gear means driven by said continuously rotating driving means and adapted to drive said rotatable transporting rollers; first operating means adapted to connect periodically said first connecting gear means with said rotatable transporting rollers so as to cause alternative periods of transportation and periods of stand-still of said rotatable transporting rollers; manually adjustable regulating means combined with said first operating means and adapted to vary the length of said periodical connections between said first connecting gear means and said rotatable transporting rollers thereby causing variation of the length of said consecutive transportation periods and of the length of flexible strip material transported during each of said consecutive transportation periods; second connecting gear means driven by said continuously rotating driving means and adapted to drive said rotatable cutting rollers; and second operating means adapted to connect periodically once during each of said transportation periods of said rotatable transporting means said continuously rotating driving means with said rotatable cutting means so as to cause one period of cutting during each of said transportation periods interrupted by periods of stand-still of said rotatable cutting means.

13. A machine for making belts from flexible strip material comprising in combination rotatable cutting rollers adapted to cut said flexible strip material; rotatable transporting rollers adapted to transport said flexible strip material between said rotatable cutting rollers; continuously rotating driving means; first connecting gear means driven by said continuously rotating driving means and adapted to drive said rotatable transporting rollers; a clutch mechanism adapted to connect periodically said first connecting gear means with said rotatable transporting rollers so as to cause alternative periods of transportation and periods of stand-still of said rotatable transporting rollers; second connecting gear means driven by said continuously rotating driving means and adapted to drive said rotatable cutting rollers; and a Geneva Cross type mechanism adapted to connect periodically said second connecting gear means with said rotatable cutting rollers so as to cause alternative periods of transportation and periods of stand-still of said rotatable cutting rollers.

14. A machine for making belts from flexible strip material comprising in combination rotatable cutting rollers adapted to cut said flexible strip material; rotatable transporting rollers adapted to transport said flexible strip material between said rotatable cutting rollers; continuously rotating driving means; a first gear train driven by said continuously rotating driving means and adapted to drive said rotatable transporting rollers; a clutch mechanism adapted to connect periodically said first gear train with said rotatable transporting rollers so as to cause alternative periods of transportation and periods of stand-still of said rotatable transporting rollers; a second gear train driven by said continuously rotating driving means and adapted to drive said rotatable cutting rollers; and a Geneva Cross type mechanism adapted to connect periodically once during each of said transportation periods of said rotatable transporting rollers said second gear train with said rotatable cutting rollers so as to cause one period of cutting of said rotatable cutting rollers during each of said transportation periods of said rotatable transporting rollers interrupted by periods of stand-still of said rotatable cutting rollers.

15. A machine for making belts from flexible strip material comprising in combination rotatable cutting rollers adapted to cut said flexible strip material; rotatable transporting rollers adapted to transport said flexible strip material between said rotatable cutting rollers; continuously rotating driving means; a first gear train driven by said continuously rotating driving means and adapted to drive said rotatable transporting rollers; a clutch mechanism adapted to connect periodically said first gear train with said rotatable transporting rollers so as to cause alternative periods of transportation and periods of stand-still of said rotatable transporting rollers; manually adjustable regulating means combined with said clutch mechanism and adapted to vary the length of said periodical connections between said first gear train and said length of said consecutive transportation periods and of the length of the flexible strip material transported by said rotatable transporting rollers during each of said consecutive transportation periods; a second gear train driven by said continuously rotating driving means and adapted to drive said rotatable cutting rollers; and a Geneva Cross type mechanism adapted to connect periodically once during each of said transportation periods of said rotatable transporting rollers said second gear train with said rotatable cutting rollers so as to cause one period of cutting of said rotatable cutting rollers during each of said transportation periods of said rotatable transporting rollers interrupted by periods of stand-still of said rotatable cutting rollers.

16. A machine for making belts from flexible strip material comprising in combination rotatable cutting rollers adapted to cut said flexible strip material; rotatable transporting rollers adapted to transport said flexible strip material between said rotatable cutting rollers; continuously rotating driving means; a first gear train driven by said continuously rotating driving means and adapted to drive said rotatable transporting rollers; a clutch mechanism adapted to connect periodically said first gear train with said rotatable transporting rollers so as to cause alternative periods of transportation and periods of stand-still of said rotatable transporting rollers; manually adjustable regulating means combined with said clutch mechanism and adapted to vary the length of said periodical connections between said first gear train and said length of said consecutive transportation periods and of the length of the flexible strip material transported by said rotatable transporting rollers during each of said consecutive transportation periods; brake means combined with said rotatable transporting rollers so as to prevent unintentional turning of said rotatable transporting rollers during said periods of stand-still of the same; a second gear train driven by said continuously rotating driving means and adapted to drive said rotatable cutting rollers; a Geneva Cross type mechanism adapted to periodically once during each of said transportation periods of said rotatable transporting rollers said second gear train with said rotatable cutting rollers so as to cause one period of cutting of said rotatable cutting rollers during each of said transportation periods of said rotatable transporting rollers interrupted by periods of stand-still of said rotatable cutting rollers; and stop means combined with said Geneva Cross type mechanism so as to prevent unintentional turning of said rotatable cutting rollers during said periods of stand-still of the same.

17. A machine for making belts from flexible strip material comprising in combination rotatable cutting rollers adapted to cut said flexible strip material; rotatable transporting rollers adapted to transport said flexible strip material between said rotatable cutting rollers; continuously rotating driving means; first connecting gear means driven by said continuously rotating driving means and adapted to drive said rotatable transporting rollers; first operating means adapted to connect periodically said first connecting gear means with said rotatable transporting rollers so as to cause alternative periods of transportation and periods of stand-still of said rotatable transporting rollers; brake means combined with said rotatable transporting rollers so as to prevent unintentional turning of said rotatable transporting rollers during said periods of stand-still of the same; second connecting gear means driven by said continuously rotating driving means and adapted to drive said rotatable cutting rollers; second operating means adapted to connect periodically said second connecting gear means with said rotatable cutting rollers so as to cause alternative periods of transportation and periods of stand-still of said rotatable cutting rollers; and stop means combined with said second operating means so as to prevent unintentional turning of said rotatable cutting rollers during said periods of stand-still of the same.

MAURICE M. BALSAM.
HENRY M. BALSAM.

REFERENCES CITED

The following references are of record in the file of this patent:

UNITED STATES PATENTS

| Number | Name | Date |
| --- | --- | --- |
| 1,272,612 | Brauer | July 16, 1918 |
| 1,625,403 | Stevens | Apr. 19, 1927 |
| 2,205,573 | Medwick | June 25, 1940 |